US009568636B2

(12) United States Patent
Cheung

(10) Patent No.: US 9,568,636 B2
(45) Date of Patent: *Feb. 14, 2017

(54) SYSTEMS AND METHODS FOR INVESTIGATING A FORMATION SURROUNDING A BOREHOLE

(71) Applicant: Schlumberger Technology Corporation, Sugar land, TX (US)

(72) Inventor: Philip S. Cheung, Wadhurst (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 411 days.

This patent is subject to a terminal disclaimer.

(21) Appl. No.: 14/216,983

(22) Filed: Mar. 17, 2014

(65) Prior Publication Data

US 2014/0200809 A1    Jul. 17, 2014

Related U.S. Application Data

(63) Continuation of application No. 13/102,236, filed on May 6, 2011, now Pat. No. 8,718,942.

(51) Int. Cl.
| | | |
|---|---|---|
| *G01V 1/40* | (2006.01) |
| *G01V 3/00* | (2006.01) |
| *G01V 3/36* | (2006.01) |
| *G01V 3/28* | (2006.01) |
| *G01V 3/38* | (2006.01) |
| *G01V 3/24* | (2006.01) |

(52) U.S. Cl.
CPC . *G01V 3/36* (2013.01); *G01V 3/00* (2013.01); *G01V 3/24* (2013.01); *G01V 3/28* (2013.01); *G01V 3/38* (2013.01)

(58) Field of Classification Search
CPC .............. G01V 3/00; G01V 3/24; G01V 3/28; G01V 3/38; G01V 3/36
USPC ................. 702/7, 11, 72; 324/338, 367, 374
See application file for complete search history.

(56) References Cited

U.S. PATENT DOCUMENTS

| | | | | |
|---|---|---|---|---|
| 7,242,194 B2 * | 7/2007 | Hayman | ................... | G01V 3/24 324/367 |
| 7,265,553 B2 * | 9/2007 | Cheung | ................... | G01V 3/38 324/367 |
| 8,718,942 B2 * | 5/2014 | Cheung | ................... | G01V 3/00 324/338 |
| 2012/0290210 A1 | 11/2012 | Cheung | | |

* cited by examiner

*Primary Examiner* — An Do
(74) *Attorney, Agent, or Firm* — Michael Dae

(57) ABSTRACT

A method, a system, and an apparatus are described for the data acquisition in the well-logging of a borehole wall during the investigation of formation properties. Data acquisition is conducted by either an adaptive phase compensation processing or a modulus mode processing, both of which use in-phase and out-of-phase current components to obtain current values. Adaptive phase compensation employs a calculation of a phase shift compensation value, which may then be applied to subsequent acquisitions and can be further processed in the generation of an image of the borehole wall.

19 Claims, 8 Drawing Sheets

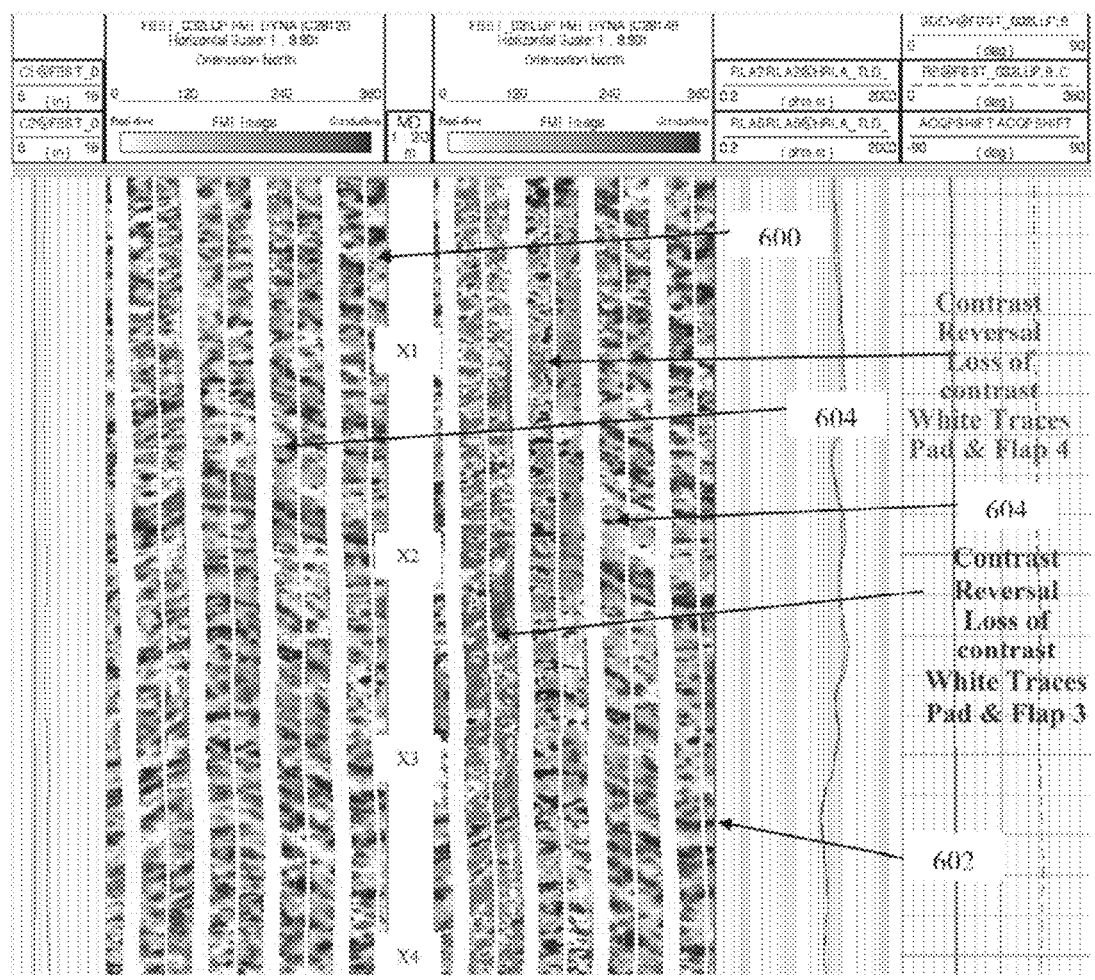

Computing both an average in-phase current and an average out-of-phase current for each pad disposed on a down-hole tool by repeatedly acquiring in-phase and out-of-phase current data from the formation relative to a voltage applied to one or more electrodes disposed on said pad over multiple depths within a depth window and averaging the acquired in-phase and out-of-phase current data over the one or more electrodes, so as to obtain the average in-phase current and the average out-of-phase current for each pad at each depth of the multiple depths within the depth window. — 702

Determining an average phase shift compensation angle from each respective phase shift compensation angle calculated for each pad of the down-hole tool by estimating a slope of a fitted line that passes through a distribution of data points of a cross plot of the computed average in-phase currents and the computed average out-of-phase currents for each pad accumulated within the depth window, the phase shift compensation angle is taken to be the slope angle of the fitted line. — 704

Applying the average phase shift compensation angle determined to in-phase and out-of-phase current data subsequently acquired by each pad of the down-hole tool from the formation over a depth of the borehole to be measured, so as to obtain phase shift compensated current values over the depth of the borehole to be measured. — 706

708

Forming an image based on the phase shift compensated current values obtained.

SYSTEMS AND METHODS FOR INVESTIGATING A FORMATION SURROUNDING A BOREHOLE

This is a continuation application of co-pending U.S. patent application Ser. No. 13/102,236, filed on May 6, 2011, and entitled "Systems and Methods for Investigating A Formation Surrounding A Borehole," which is hereby incorporated in its entirety for all intents and purposes by this reference.

FIELD

This disclosure generally pertains to investigation of formation properties through well-logging of a borehole wall and to data acquisition using a downhole tool to investigate the properties of the borehole wall. In particular, in the exploration of geological deposits in a formation, such as for example underground petrochemical fossil deposits in earth formations, a downhole tool can be used where an AC voltage is applied to one or more electrodes, and the resultant AC current flowing through the electrodes is measured. The current values can be acquired by an electronic component of the downhole tool, using either an adaptive phase compensation acquisition or a modulus mode acquisition, for example depending on the drilling fluid used, such as for instance a conductive fluid (e.g., water-based mud) or a non-conductive fluid (e.g., an oil-based mud), respectively.

BACKGROUND

For purposes of geologic exploration, such as for example in connection with exploring the earth for underground petrochemical fossil deposits, it is known to measure certain electrical properties existing along an earth-formation wall. For example, the variations in the electrode currents and/or voltages thus monitored and displayed have been found to correlate with certain properties of the adjacent earth formation. One way in which this correlation can be determined is to form a hole in the earth by coring. For example, a cylindrical cut can be made into the earth and the core inside the cut removed intact, to leave a borehole. Logging of the exposed wall inside the borehole can then be performed, and the resultant measured electrical values at each depth may be compared with the structure and properties of the core at corresponding locations. Such coring and logging can enable one to attribute specific physical, chemical, and geologic properties to the logging data obtained, with a high degree of certainty.

A borehole can be formed, for example by a conventional rig, and with the borehole filled with a drilling mud, an electrode structure on a pad is moved along the length of the borehole while a voltage is applied between the measurement electrodes on the pad and a return electrode. The resultant currents and/or voltages present at the borehole wall are monitored and recorded. Recording may be on a magnetic tape, on an ink recorder, on a computer disk or in a computer memory, as some examples. A simultaneous record of the position of the electrode structure along the borehole wall can be made, so that a plot of distance along the borehole against a selected electrical property may be formed from the data obtained, from which a visually-observable image of the segment of the borehole wall swept over by the electrodes on the pad can be generated.

As one example, a technique for obtaining such electrical measurements of a formation is to use an array of electrodes or "buttons" mounted on, and insulated from, an electrically conductive pad. The pad is pushed against the borehole wall as the pad is moved along the borehole, while a voltage or current is applied between each button and another return electrode, such as a remote electrode located on the tool body. The currents flow at least in part from the electrodes through the borehole wall, in a magnitude dependent upon the properties of the earth formation adjacent the electrodes. Such procedures have been termed as microresistivity measurements, since they measure the electrical resistivity of relatively small vertical segments of the wall structure.

Improvements may yet be made to the acquisition of electrical data from the borehole logging during investigation of formation properties, including for example that are less complicated and less time consuming, and that may be viable with existing well-logging tools and systems, and that may be viable for example with bandwidth capabilities of such tools and systems.

SUMMARY

Generally, methods, systems, and apparatuses are described that are directed to data acquisition in the well-logging of a borehole wall during the investigation of formation properties, which can address the problems described herein. For example, improvements in the efficiency of data acquisition, storage, and/or transmission may be obtained with the methods, systems, and apparatuses described herein.

In one example, a method of modulus mode data acquisition comprises detecting in-phase current data and out-of-phase current data of a formation relative to an applied voltage from each electrode button existing on a down-hole tool. The step of detecting includes obtaining in-phase current data and out-of-phase current data from each electrode button at multiple depths. Absolute values of current are determined based on the square root taken from the sum of the square of the in-phase current data and the square of the out-of-phase current data obtained from each electrode button at a given depth. Each of the absolute values of current is a single number. An image of the borehole may be obtained from the absolute values of current.

In another example, data acquisition is carried out by an adaptive phase compensation acquisition that uses an in-phase current component and an out-of-phase current component in the determination of an average phase shift compensation angle. The average phase shift compensation angle is then applied to subsequent acquisitions to obtain phase shift compensated current values, from which an image of the borehole may be obtained. In one embodiment, the adaptive phase compensation acquisition is particularly useful with a conductive drilling fluid (e.g., a water-based mud).

With further reference to data acquisition through adaptive phase compensation, one example can include the following steps.

1) Compute at a given position (depth) of a down-hole tool, with a down-hole processor of the down-hole tool, both an average in-phase current and an average out-of-phase current for each pad present on the down-hole tool.

2) Send the computed in-phase current and out-of-phase current from the down-hole processor to a surface processor through a transmission component.

3) Steps 1) and 2) are repeated to acquire current data at multiple depths. Having acquired a number of current data at different depths, determine a phase compensation angle for each pad by estimation of a slope of a fitted line that passes through the distribution of data points of a crossplot of the computed in-phase currents and the computed out-of-phase currents accumulated at the multiple depths for each respective pad.

4) Determine an average phase shift compensation angle ϕ by a weighted average of the slope angles determined from the fitted lines of the pads.

5) The average phase compensation angle ϕ is sent through the transmission component from the surface processor to the down-hole processor and is applied down-hole to subsequent data acquisitions so as to obtain phase shift compensated current values, for example by taking the phase compensated current as $I_{phase\ compensated} = I_{in-phase} \cos \phi + I_{out-of-phase} \sin \phi$.

6) Each phase shift compensated current value is transmitted as a single number from the down-hole processor to the surface processor through the transmission component, an image of the borehole may be obtained from the phase shift compensated current values.

In one embodiment, the average current for a pad is the average taken over selected middle electrode buttons of the pad at a given depth. Such average measurements are made at a multiple of depths within a depth window and are all transmitted to the surface. In one example, averaging means to average the in-phase and out-of-phase currents over the selected buttons of the pad, so as to give the average in-phase and out-of-phase currents for the pad at a certain depth.

In an example of using four middle electrode buttons of a pad, there would be an in-phase and an out-of-phase current measurement for each electrode button giving 8 numbers detected for that pad at each depth. These respective in-phase and out-of-phase current measurements are averaged by the down-hole processor to give the average in-phase and average out-of-phase currents for the respective pad at the given depth. The average in-phase and average out-of-phase currents for all the pads are computed, making eight numbers in total for a four-pad down-hole tool, all of which are then transmitted to surface. This detection, averaging, and transmission to the surface, can be repeated over multiple depths, for example within a depth window.

When data for the multiple depths in the depth window have been transmitted and accumulated at the surface, a surface processor can determine the average phase shift compensation angle at the most recent depth (i.e. the current depth) using the data points previously taken from the multiple depths, which also may be referred to as a retrospective data window when the average phase shift compensation angle is determined. For example, the retrospective data window is the current data used for the phase compensation determination that are detected over multiple depths in the depth window, which covers depths ranging over a distance traveled by the pads during detection of such current data. It will be appreciated that there can be M depths within the retrospective data window. For example, for each pad there are therefore M pairs of average in-phase and out-of-phase currents, i.e. a pair of currents for each depth within the M depths. In a crossplot of the M pairs of points, the phase shift compensation angle Φ can be computed for a respective pad by a fitted line procedure, and taking Φ as the slope angle. The values of Φ, one for each pad (e.g. four pads), are combined as a weighted average to give a single average ϕ to be applied to all measurements of the logging apparatus, e.g. the measurements from all of the pads and from all flaps that may be present.

In one embodiment, the weight used for each pad, for example can be based on the 'quality' of the fit for the pad, for example using the ratio of the standard deviation of the points in the direction parallel to the fitted line relative to the standard deviation of the points in the direction perpendicular to the fitted line.

Exemplary Embodiments of Adaptive Phase Compensation Acquisition

In one embodiment, a method of investigating a formation surrounding a borehole comprises computing both an average in-phase current and an average out-of-phase current for each pad disposed on a down-hole tool by repeatedly acquiring in-phase and out-of-phase current data from the formation relative to a voltage applied to one or more electrodes disposed on the pad over multiple depths within a depth window, and by averaging the acquired in-phase and out-of-phase current data over the one or more electrodes, so as to obtain the average in-phase current and the average out-of-phase current for each pad at each depth of the multiple depths within the depth window.

An average phase shift compensation angle is determined from each respective phase shift compensation angle calculated for each pad of the down-hole tool by estimating a slope of a fitted line that passes through a distribution of data points of a cross plot of the computed average in-phase currents and the computed average out-of-phase currents for each pad accumulated within the depth window. The phase shift compensation angle is taken to be the slope angle of the fitted line.

The average phase shift compensation angle determined is then applied to in-phase and out-of-phase current data subsequently acquired by each pad of the down-hole tool from the formation over a depth of the borehole to be measured, so as to obtain phase shift compensated current values over the depth of the borehole to be measured.

An image of the borehole may then be formed based on the phase shift compensated current values obtained.

In one example of the method above, each phase shift compensated current value comprises a single number based on a linear combination of the in-phase and out-of-phase current data weighted by the cosine and sine of the average phase shift compensation angle. For example, $I_{phase\ compensated} = I_{in-phase} \cos \phi + I_{out-of-phase} \sin \phi$.

In one example of the method according to any of the preceding, further comprising repeatedly and periodically updating the average phase shift compensation angle after the down-hole tool has passed the depth of the borehole to be measured and the average phase shift compensation angle has been applied to the subsequent acquisitions over the depth of the borehole to be measured, and applying the updated average phase shift compensation angle over another depth of the borehole to be measured.

In one example of the method according to any of the preceding, the current data are acquired in the presence of a conductive borehole fluid, such as for example, a water-based mud.

In one example of the method according to any of the preceding, the step of forming the image comprises removing offsets that are present in the phase shift compensated current values through equalization processing.

In one example of the method according to any of the preceding, further comprising storing the phase shift compensated current values in a memory component of the down-hole tool.

In one example of the method according to any of the preceding, further comprising sending the phase shift compensated current values to surface via a transmission component.

In one example of the method according to any of the preceding, the determining step is performed down-hole.

In one example of the method according to any of the preceding, the determining step is performed at surface.

In one example of the method according to any of the preceding, the method of further comprising: sending the computed average in-phase currents and average out-of-phase currents from down-hole to surface for subsequent surface processing, and sending the determined average phase shift compensation angle from surface to down-hole for subsequent down-hole application.

In one example of the method according to any of the preceding, the computing step comprises selecting one or more middle electrodes within an electrode array of each pad to acquire the in-phase and out-of-phase current data.

Exemplary Embodiments of Systems for Adaptive Phase Compensation Acquisition

One embodiment of a system for investigating a formation surrounding a borehole, comprises a plurality of pads disposed on a down-hole tool. Each pad comprises a plurality of electrodes configured to acquire in-phase current data and out-of-phase current data from the formation relative to a voltage applied to the electrodes. The system further comprises at least one processor configured to:

1) compute both an average in-phase current and an average out-of-phase current for each pad of the down-hole tool by repeatedly acquiring in-phase and out-of-phase current data from the formation relating to one or more selected electrodes of each pad over multiple depths within a depth window and averaging the acquired in-phase and out-of-phase current data over the selected electrode(s), so as to obtain the average in-phase current and the average out-of-phase current for each pad at each depth of the multiple depths within the depth window;

2) determine an average phase shift compensation angle based on each respective phase shift compensation angle calculated for each pad of the down-hole tool by estimating a slope of a fitted line that passes through a distribution of data points of a cross plot of the computed average in-phase currents and the computed average out-of-phase currents for each pad accumulated in the depth window, the phase shift compensation angle is taken to be the slope angle of the fitted line; and 3) apply the average phase shift compensation angle determined to in-phase and out-of-phase current data subsequently acquired by each pad of the down-hole tool from the formation over a depth of the borehole to be measured so as to obtain phase shift compensated current values over the depth of the borehole to be measured.

In one example of the system according to the above, the at least one processor is further configured to calculate each phase shift compensated current value as a single number based on a linear combination of the in-phase and out-of-phase current data weighted by the cosine and sine of the average phase shift compensation angle. For example, $I_{phase\ compensated} = I_{in\text{-}phase} \cos \phi + I_{out\text{-}of\text{-}phase} \sin \phi$.

In one example of the system according to any of the preceding, the at least one processor is further configured to form an image of the borehole based on the phase shift compensated current values that involves removing offsets that are present in the phase shift compensated current values through equalization processing.

In one example of the system according to any of the preceding, the at least one processor is further configured to repeatedly and periodically update the average phase shift compensation angle after the down-hole tool has passed the depth of the borehole to be measured and the average phase shift compensation angle has been applied to the subsequent acquisitions over the depth of the borehole to be measured, and to apply the updated average phase shift compensation angle over another depth of the borehole to be measured.

In one example of the system according to any of the preceding, further comprising a memory component included in the down-hole tool and configured to store the phase shift compensated current values obtained.

In one example of the system according to any of the preceding, the at least one processor comprises a down-hole processor included in the down-hole tool and configured to 1) compute the average in-phase and average out-of-phase current data; 2) determine the average phase shift compensation angle; and 3) apply the average phase shift compensation angle to subsequent acquisitions of in-phase and out-of-phase current data.

In one example of the system according to any of the preceding, the at least one processor comprises a surface processor configured to determine the average phase compensation angle.

In one example of the system according to any of the preceding, further comprising a transmission component configured to send the computed average in-phase currents and average out-of-phase currents from down-hole to surface for subsequent surface processing and to send the determined average phase shift compensation angle from surface to down-hole for subsequent down-hole application.

In one example of the system according to any of the preceding, the down-hole tool is a wireline logging tool, a logging-while-drilling (LWD) tool, or a measurement-while-drilling (MWD) tool.

Exemplary Embodiments of Methods and Systems of Modulus Mode Acquisition

In one embodiment, a method of investigating a formation surrounding a borehole, comprises acquiring in-phase current data and out-of-phase current data from the formation relative to a voltage applied to a plurality of electrodes disposed on a down-hole tool at multiple depths. Absolute values of current are determined based on the square root taken from the sum of the square of the in-phase current data and the square of the out-of-phase current data acquired from the electrodes at each depth of the multiple depths, each of the absolute values of current is a single number. An image of the borehole may be formed based on the absolute values of current determined.

In one example of the method according to the above, the current data are acquired in the presence of a non-conductive borehole fluid, such as for example, a oil-based mud.

In one example of the method according to any of the preceding, further comprising storing the absolute values of current in a memory component of the down-hole tool.

In one example of the method according to any of the preceding, further comprising sending the absolute values of current as single numbers to surface via a transmission component.

In one embodiment, a system for investigating a formation surrounding a borehole, comprises a plurality of electrodes disposed on a down-hole tool and configured to acquire in-phase current data and out-of-phase current data from the formation at multiple depths. The system further comprises at least one processor configured to determine absolute values of current taken from the square root of the sum of the square of the in-phase current data and the square of the out-of-phase current data acquired by the electrodes at each depth of the multiple depths, each absolute value of current is a single number.

In one example of the system according to the above, the at least processor comprises a surface processor configured to form an image of the borehole based on the absolute values of current.

In one example of the system according to any of the preceding, further comprising a memory component included in the down-hole tool and configured to store the absolute values of current.

In one example of the system according to any of the preceding, further comprising a transmission component configured to transmit the absolute values of current as single numbers from down-hole to surface.

BRIEF DESCRIPTION OF THE DRAWINGS

FIG. 6 shows an image of a borehole wall taken in accordance with the adaptive phase compensation acquisition and compared with an image of taken in accordance with modulus mode acquisition as described herein.

FIG. 7 shows one example of a flow chart of a general implementation of adaptive phase compensation data acquisition.

DETAILED DESCRIPTION

Data acquisition may be carried out either by a modulus mode of data acquisition or by an adaptive phase compensation acquisition, for example depending on the drilling fluid used, such as for instance where modulus mode data acquisition may be useful in non-conductive muds (NCMs) and where adaptive phase compensation data acquisition may be useful in water-based muds (WBMs). Both implementations make use of an in-phase current component and an out-of-phase current component. In adaptive phase compensation, the in-phase current components and the out-of-phase current components are used in the calculation of a phase shift compensation value. The phase shift compensation value is then applied to subsequent acquisitions and can be further processed in the generation of an image of the borehole wall.

While modulus mode acquisition may be useful in NCMs, such as in an oil-based mud (OBM), where resistivity is higher than in water-based muds, it will be appreciated that adaptive phase compensation acquisition can be used in oil-based muds when appropriate.

Such methods, systems, and apparatuses as described herein are useful for data acquisition in the investigation of formation properties of geological deposits, such as for example underground petrochemical fossil deposits in earth formations. While earth formations and petrochemical exploration are referred to, it will be appreciated that in appropriate circumstances, the concepts described herein can be useful in the data acquisition of other formations and exploration of other materials.

Figure 1:
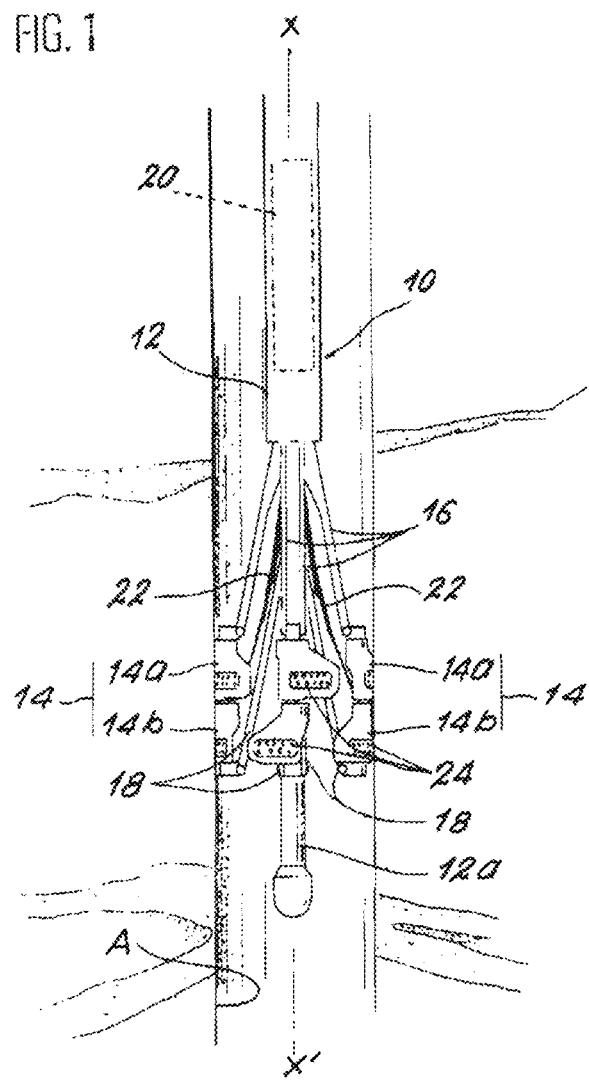
FIG. 1 shows one example, diagrammatic in nature, of a well-logging apparatus and one example of a system for data acquisition in the investigation of a borehole wall.

FIG. 1—Exemplary Apparatuses

FIG. 1 shows one example diagrammatic in nature of a well-logging apparatus with a down-hole tool that can be used in a system for data acquisition in the investigation of a borehole wall.

With reference to FIG. 1, one example of a down-hole tool of a well-logging apparatus for logging a borehole wall is shown. A tool such as shown in FIG. 1 is one example of an apparatus that may be used for the data acquisition methods and concepts described herein, for example with respect to FIGS. 2-8 on data acquisition using a modulus mode and using adaptive phase compensation.

FIG. 1 shows a borehole A extending vertically into an earth formation to produce a generally cylindrical exposed wall. The borehole A will normally have been formed by conventional borehole drilling equipment typically used in exploration for petrochemical deposits, such as along vertical axis XX'. During such drilling, a drilling mud is commonly used, and is still present in the borehole A. The mud may be a water-based mud, and hence has a relatively low resistivity, but it will be appreciated that the mud may be an NCM such as for example an OBM having a high resistivity, e.g., greater than a million ohm-meters.

In one example, suspended within the borehole A is a down-hole tool 10. The down-hole tool 10 may be suspended from surface equipment, such as for example a pulling cable connected to the tool 10 and extends above it, for example around sheaves to a spool of a winch. For example, the spool of the winch can be rotated in either direction, to raise or lower the down-hole tool 10, such as by operator control of an engine for instance in a winch-carrying vehicle. The sheave can be supported from a derrick frame centered over the borehole A. Such surface equipment, while not shown, is well known and not further described.

In one example, an electronic apparatus including a processor is provided, which permits control of the various operations during a logging run, as well as providing signal processing (or surface processor) and can store data received from the down-hole tool 10. It will be appreciated that such an electronic apparatus can be configured to include any appropriate or necessary processing capability, such as for example equalization, filtering/noise reduction capability, depth correction capability, and smoothing capability.

It also will be appreciated that FIG. 1 represents just one example of a formation evaluation (FE) tool and that others may be employed and adapted to carry out the methods described herein. As another example, the FMI™ Formation MicroImager introduced by Schlumberger in 1991, may also be used to implement the modulus mode acquisition and the adaptive phase compensation methods described below.

FIG. 1 shows just one example of a down-hole tool used after a borehole has been drilled. It will be appreciated that other logging tools may be used, such as other wireline (WL) tools that are different from the tool in FIG. 1 or the FMI™ Formation MicroImager mentioned above. Some examples of such WL tools can be found in U.S. Pat. No. 7,066,282 and US Patent Application Publication 2010/

0013487, which are herewith incorporated by reference. Further, other tools that perform logging while drilling (LWD) or that perform measurement while drilling (MWD) may be employed. Some example of such LWD or MWD tools can be found in U.S. Pat. Nos. 7,095,233 and 5,339,036, which are herewith incorporated by reference.

Turning back to FIG. 1, the down-hole tool 10 includes a sonde 12 and a down-hole component 20. The down-hole component 20 includes electronic components such as one or more down-hole processors. The down-hole component 20 may be constructed and arranged as a cartridge, and can be connected to the sonde 12 through suitable physical connections.

Such components of the down-hole electronics may include one or more processing components and processors with appropriate software and/or firmware. Such processors can allow for the pre-processing of electrical measurements, such as for example complex current measurements, so that data can be transmitted for example to a surface processor. It will be appreciated that transmission may be through an appropriate transmission component, which may be through a cable (i.e. wired transmission) or through wireless transmission.

With brief reference to electrically investigating a borehole, FIG. 1 shows a pad/flap assembly 14 between the sonde 12 and bottom portion 12a. Such pads 14a and flaps 14b may each be mounted with a plurality of electrode buttons 24. An AC voltage may be applied between the electrode buttons 24 and a source electrode, and through the formation of the borehole, from which individually measurable AC currents may be obtained. The source electrode in some examples may be located on an upper part of the down-hole tool. As shown, the pad/flap assembly 14 can be mounted to the sonde 12 through hinged arms 16, 18 including the use of any biasing members 22 as appropriate. The electrode buttons 24 can be arranged in an array. For example, they may be arranged as one or more rows on pads and flaps, e.g. pads 14a and flaps 14b. In some examples, such as the FMI™ Formation MicroImager introduced by Schlumberger in 1991, each pad and flap may have multiple buttons, such as for example two rows of 12 buttons, where the down-hole tool may have four pads and four flaps. Such a configuration would give 192 buttons on the down-hole tool.

Particularly, a tool such as the down-hole tool in FIG. 1 is provided for investigating a borehole wall with the pads and flaps pressed against the borehole wall. For example, each pad and flap carries an array of electrode buttons that are configured for resistivity logging, such as for example in the detection of resistivity anomalies that may be indicative of fine fractures and stratigraphy. The electrode buttons are operatively connected to one or more sources of electrical energy so as to allow for currents to be individually measured. As the tool is moved along the borehole A, an axially continuous area of the borehole wall can be examined by detecting current anomalies which may indicate for example the presence of bed layers, cracks or fractures in an earth formation.

The data obtained through the electrodes of a down-hole tool, such as in FIG. 1, may be a type of conductivity measurement or signal. Conductivity measurements or signals may include data representative of current measurements, which may be information on the formation resistivity of a borehole wall. Conductivity measurements or signals may also include data after additional processing steps, which may be performed or may be practiced with other signal or measurement processes used to generate an image log of conductivity of a borehole wall.

From the conductivity measurements, high resolution images of the borehole wall may be obtained. High resolution may refer to the ability to spatially resolve fine features of a measured characteristic from a visual image of such characteristic. Such fine features include minute variations of the characteristic in the circumferential as well as vertical directions along the borehole wall. For example, high resolution features such as on the order of several millimeters in magnitude can be observed. For example, in a conductivity image such as may be obtained herein, high resolution features can be observed such as vugs, small stratigraphy beds and their circumferential thickness variations, small scale lithology changes, pore sizes, fractures and their density and height, and their vertical and lateral continuity. It will be appreciated that finer details may be observed.

The data obtained by a down-hole tool such as that in FIG. 1 may be telemetered, such as by wired or wireless transmission, to a surface processor having an electronic apparatus. In some examples, such an electronic apparatus can serve to record and store the data sensed by the down-hole tool. It will be appreciated that the surface processor may be one or more processors that processes the stored data on site or, if appropriate, subsequently process the stored data off-site.

Figure 2:
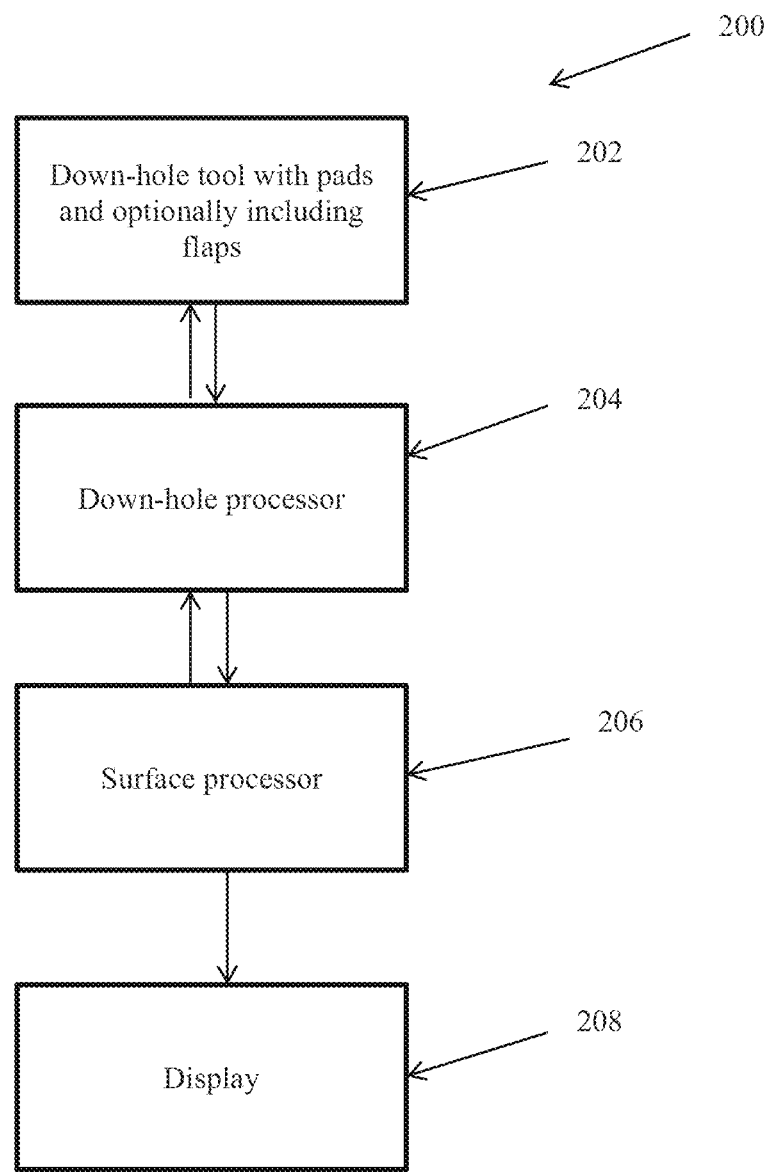
FIG. 2 shows one example, schematic in nature, of a system for data acquisition in the investigation of a borehole wall.

FIG. 2—Exemplary Systems

FIG. 2 shows one example schematic in nature of one embodiment of a system 200 for data acquisition in the investigation of a borehole wall. The system 200 may be employed for either modulus mode data acquisition or for adaptive phase compensated data acquisition. The system 200 may include a down-hole tool with pads and optionally flaps 202 that obtain data which is received by a down-hole processor 204. The down-hole tool, for example including pads and flaps may be constructed such as described above and for example as shown in FIG. 1. Each pad and flap present on the down-hole tool may have an array of electrode buttons. The electrode arrays may be made, for example such that certain or all electrodes are configured to acquire in-phase and/or out-of-phase currents for each pad and/or flap. The current data detected by the electrodes of the pads and flaps 202 are transmitted to the down-hole processor 204. See arrow from the down-hole tool pads and flaps 202 to the down-hole processor 204. Likewise, the down-hole processor 204 may be configured to activate and deactivate the down-hole tool pads and flaps (see arrow from down-hole processor 204 to the down-hole tool pads and flaps 202).

A transmission component transmits the data from the down-hole processor to the surface processor 206 and from the surface processor to the down-hole processor. See arrows to/from down-hole processor 204 and surface processor 206. It will be appreciated that an appropriate transmission component may be a cable or a component that allows for wireless communication between the processors. After processing by the surface processor 206, an image of the borehole may be produced on a display 208 and/or stored in a memory component.

It will be appreciated that specific use of a down-hole processor and a surface processor is merely one embodiment. Such a configuration may be useful for example in well-logging apparatuses that use down-hole and surface electronics to carry out such processing. However, the system 200 is not particularly limited to such a processor configuration. It will also be appreciated that the location of the processing is not meant to be limiting. For example, a well-logging apparatus can be configured with appropriate processing capability so as to carry out all or some of the processing down-hole, all or some of the processing at the surface, or some combination of both. In other examples, the system 200 may include as appropriate one or more processors that perform all of the processing down-hole, which can reduce or avoid the need for separate surface processing electronics.

FIGS. 3-8—Measurement and Processing

Currents detected using conventional borehole logging techniques and processing are measurements that have been observed to be complex in nature, i.e. the currents have a real part and an imaginary part. This is due for example to impedance characteristics of the formation, such as in the rock, or the mud in the borehole, or to imperfections in the electronics of the tool. To make a microresistivity image, the real and imaginary parts should be combined appropriately to give single real numbers that are related to the resistivity of the rock, and that can in turn be represented as colors in an image. Such complex currents may also present issues in the efficiency that the data measurements can be stored and/or transmitted. For example, such issues have been observed in the limited bandwidth such as for example in the transmission of the data from down-hole electronics to surface processing. This can be particularly pertinent for an imaging tool where over 100 'button' measurements may be made at each position of the tool. As a consequence, it has been customary to measure only the real part of the current, i.e. the current that is in-phase with the applied voltage, but not the out-of-phase current component (i.e. imaginary part). This procedure may reduce the amount of data that could be transmitted by one half. If the current data is substantially in-phase relative to the applied voltage then such data acquisition may be appropriate. However, for current data that include significant out-of-phase components, such data acquisition may not be optimal.

For example, large phase shifts in button current relative to applied AC voltage may exist when a formation evaluation (FE) tool is logged in conductive borehole fluid (e.g., saline or other water-based mud (WBM)) and in low resistivity formations. When the phase shift is large, poor images may be obtained, if only the in-phase component of the button current is acquired by the tool, while the information in the out-of-phase (e.g.)+90° component is ignored.

Thus, improvements may yet be made for data acquisition of borehole logging in the investigation of formation properties that are for example less complicated, less time consuming, and that may be viable with existing well-logging tools and systems, and that may be viable for example with bandwidth capabilities of such tools and systems.

One solution is to acquire the current component in the direction of the shifted phase, which is referred to as "phase compensated acquisition", and such solution can be implemented whereby the button current is acquired at one of several fixed phase angles relative to the applied voltage.

However, certain drawbacks may exist in phase compensated acquisition. For example, at least two passes of the tool should be made, the first to determine the phase shift, and the second to re-log with the appropriate phase compensation. To allow the average phase shift to be determined, the out-of-phase current is acquired for a small number of buttons, for example so as not to saturate the bandwidth, in addition to the in-phase current acquired for all buttons. An average phase shift can then be determined using data from the first pass via a crossplot of the average in-phase and average out-of-phase components. Also, the possibility that the phase shift may vary with depth can be dealt with by logging a well in sections: detecting and compensating the phase shift for each section. In practice, this can be complicated and time-consuming.

Modulus Mode Data Acquisition

Figure 3:
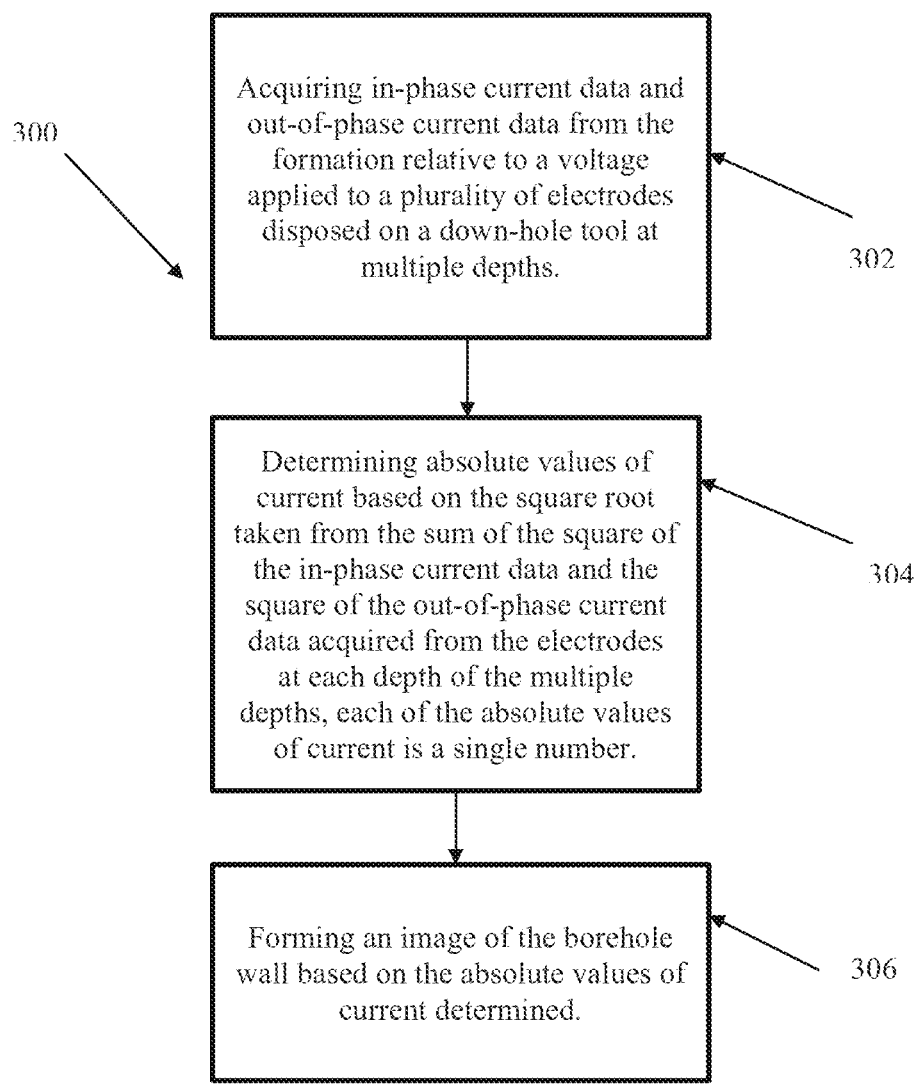
FIG. 3 shows one example of a flow chart of a general implementation of modulus mode data acquisition.
Figure 4:
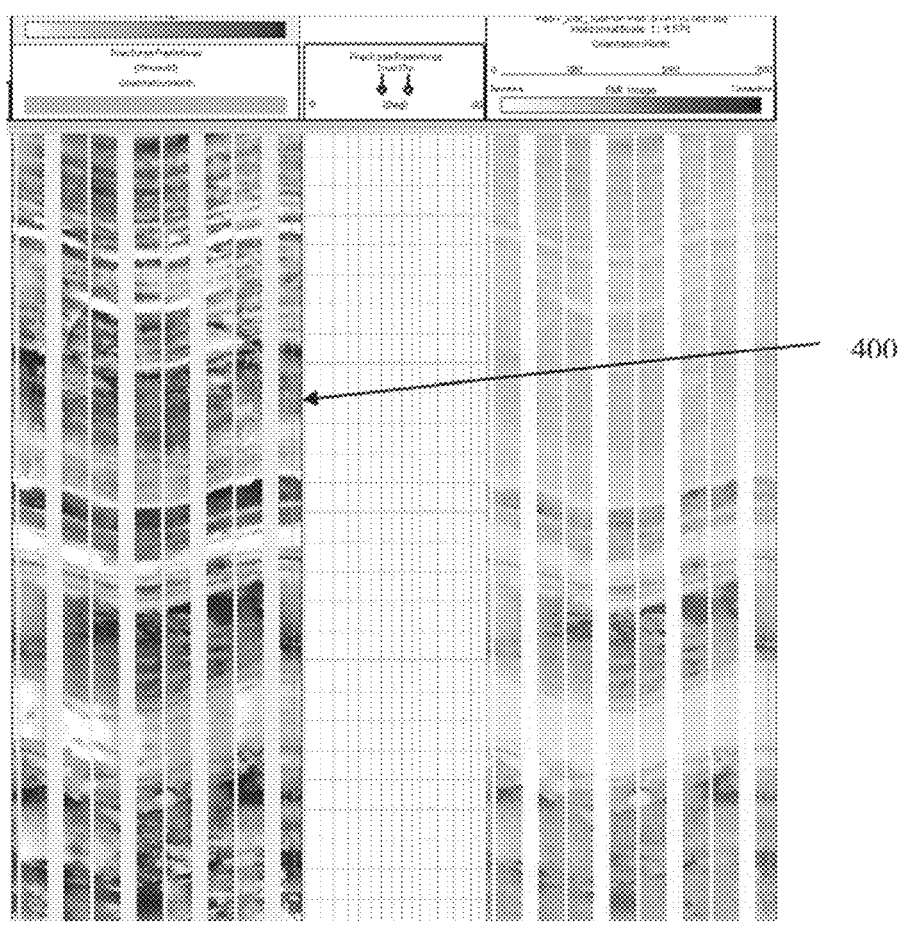
FIG. 4 shows an image of a borehole wall taken in accordance with modulus mode data acquisition described herein.

Modulus mode, however, may be implemented as an improvement to phase compensation. FIG. 3 shows one example of a flow chart of a general implementation of a method 300 for modulus mode data acquisition. FIG. 4 shows an image 400 of a borehole wall taken in accordance with modulus mode acquisition described herein.

In FIG. 3, the method 300 includes acquiring in-phase current data and out-of-phase current data from the formation relative to a voltage applied to a plurality of electrodes disposed on a down-hole tool at multiple depths 302. The down-hole tool may have pads and optionally flaps. Absolute values of current are then determined 304, for example from a down-hole processor, based on the square root taken from the sum of the square of the in-phase current data and the square of the out-of-phase current data. For example, the absolute values are determined by a formula:

$$\sqrt{(I_{in\text{-}phase}^2 + I_{out\text{-}of\text{-}phase}^2)} = |I|$$

An image can be formed based on the absolute values of current 306. In some embodiments, the absolute values of current are then sent as single numbers from a down-hole processor to a surface equipment for further processing.

In FIG. 4, the image 400 shows good image quality even when compared to an image acquired in oil-based mud (OBM).

As described above, modulus mode may be suitable when offsets are not present, e.g. in non-conductive wellbore fluids such as an oil-based mud. By acquiring the modulus of the current, the effect of phase shift can be eliminated, irrespective of whether the phase shift is constant or variable with depth, and without the need to know what the phase shift is. In modulus mode, one pass can be sufficient.

However, the button current may also have offsets as well as phase shifts. The images acquired in modulus mode may exhibit anomalies when the offsets are large relative to the current amplitude. By making phase compensation adaptive, i.e., adjusted periodically and repeatedly, such issues may be addressed. Below, further explanation is provided as to why modulus mode may be a suitable approach for downhole current data acquisition, and when it may not be desirable to employ the modulus mode of current data acquisition, such as when offsets are present. Further, explanation is provided as to how adaptive phase compensated acquisition may be a good solution in some cases.

Figure 5A:
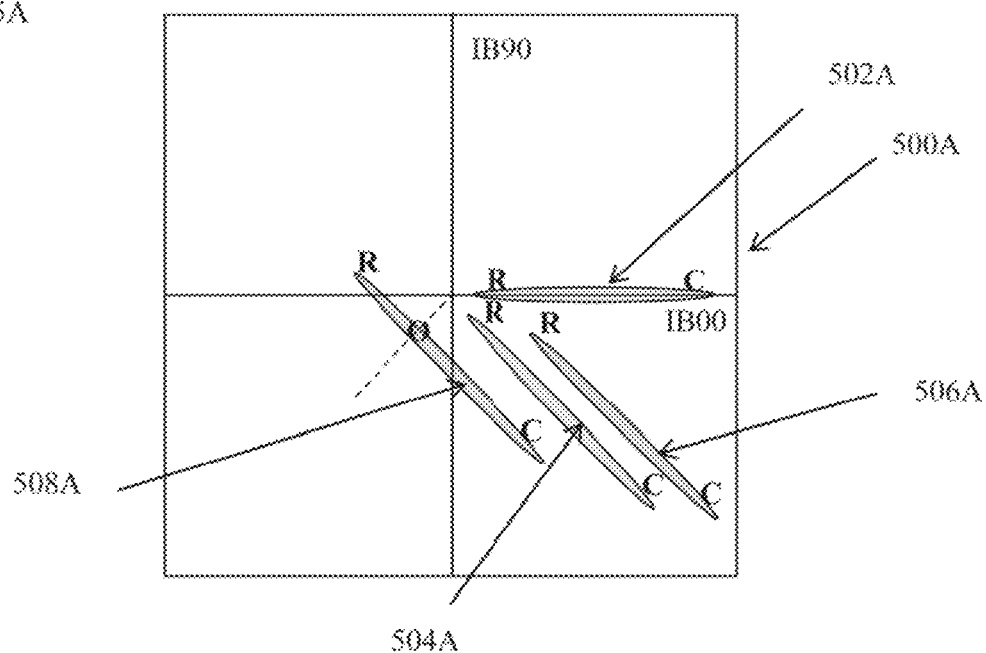
FIG. 5A shows a crossplot of example button current components relative to an applied voltage, some of which show phase shifts only, and some of which show both phase shifts and offsets.

With further reference to modulus mode acquisition, FIG. 5A shows a crossplot 500A of example button current components relative to an applied voltage, some of which show phase shifts only, and some of which show both phase shifts and offsets. Particularly, FIG. 5A shows an example crossplot 500A of the button current components at 0° (IB00) and 90° (IB90) relative to an applied voltage. FIG. 5A is a schematic in complex plane showing groups of data (ellipses 502A-508A) with respect to phase shifts (rotation) and offsets (translation) if any. R and C correspond to relatively resistive and conductive portions of the formation indicated by the data. The spread of data values along the long axis of an ellipse correspond to the range of formation resistivities encountered, with the most resistive and conductive values respectively on the left (R) and right (C) extremities of an ellipse.

Data with no phase shift and no offset are represented by the ellipse 502A. The ellipse 504A corresponds to data which have undergone a phase shift (rotation) e.g. of −45°. As shown, the corresponding data points on the ellipses 502A and 504A can have the same absolute current |I| values, i.e. |I| gives the same measure of signal strength irrespective of the rotation about the origin. In particular, it can be observed that |I| decreases monotonically with increase of formation resistivity in the ellipses 502A and 504A. Thus, modulus mode acquisition can correct for phase shift, for example when the data have undergone a rotation. Modulus mode acquisition can be particularly useful, such as for example when using non-conductive drilling fluids, such as oil-based muds (OBM).

However, offsets in IB00 and IB90 may occur due to the tool construction/configuration, the borehole fluid used and other borehole effects. Two examples of data with offsets are shown by the ellipses 506A and 508A. Such examples may be observed in conductive mud, e.g. water-based mud (WBM). The ellipse 506A is obtained from the ellipse 502A by adding a positive offset to IB00, and a negative offset to IB90. For the ellipse 508A, the offsets are opposite in sign, i.e. obtained from the ellipse 502A by adding (−) offset to IB00 and (+) offset to IB90. It will be appreciated that the phase shifts and offsets shown are examples only, as other offset and phase shift combinations may be possible and may be observed in different environments. It will also be appreciated that the size of the offsets shown in FIG. 5A may be exaggerated for clarity. In some practical applications for example, the length of the long axis of the ellipses can be about ~3000 mA, for formation resistivities between about 0.2 and 2000 Ωm, whereas the magnitudes of offsets can be about ~100 mA.

On the ellipse 508A, the intersection marked O indicates the point between the major axis of the ellipse and the perpendicular dropped from the origin to the same major axis. By definition |I| is the distance from the origin to a data point, and has a minimum value at O. There is a corresponding point O for the ellipse 506A, but in FIG. 5A, that point falls outside the ellipse and is not shown. Depending on the direction of the major axis of an ellipse and the offset, a point O will fall inside or outside the ellipse. With reference to |I|, anomalous behavior may be observed for example if O falls inside an ellipse, between the most conductive point C and the most resistive point R. In the ellipses 502A and 504A for example, |I| decreases monotonically with increase in resistivity. It will be appreciated that this also applies to the ellipse 506A. On the ellipse 508A, however, |I| has a minimum value at the point marked O. So the points with the lowest |I| values will be those in the vicinity of O, and not those which have the highest resistivity, e.g. in the vicinity of R. In an image the color goes from light to dark as |I| increases, so the image is dark where the formation is conductive and bright where the formation is resistive. However, in the case where O falls between C and R, artifacts may appear where 1) white 'rings' and 'traces' may appear where the normal color would be intermediate between black and white, for those data points close to O, and
2) color changes going from dark to light, as going from O to R, will instead change from light to dark (an effect called 'color contrast reversal').

With reference to FIG. 6, an image 602 acquired in modulus mode is shown on the right. The image shows many instances of the anomalies described above. These anomalies can be misleading for interpretation. On the left side of FIG. 6, an image 600 is acquired by adaptive phase compensation mode, where these anomalies are absent, as will be explained below.

In the absence of the image 600 on the left, one might ask how it is possible to tell if a white feature is real or an artifact. In FIG. 6, one observation is that in the image on the right 602, the white features occur on some pads but not others. Geologically this may be observed as inconsistent, and perhaps considered almost impossible, in that rock changes abruptly going from one pad to the next. As described above, the O point may fall outside the data distribution on some pads, so that anomalies may not occur.

Thus modulus mode can give incorrect images when offsets are present and may be desirable for conditions in which there are no offsets or only relatively small offsets.

Figure 5B:
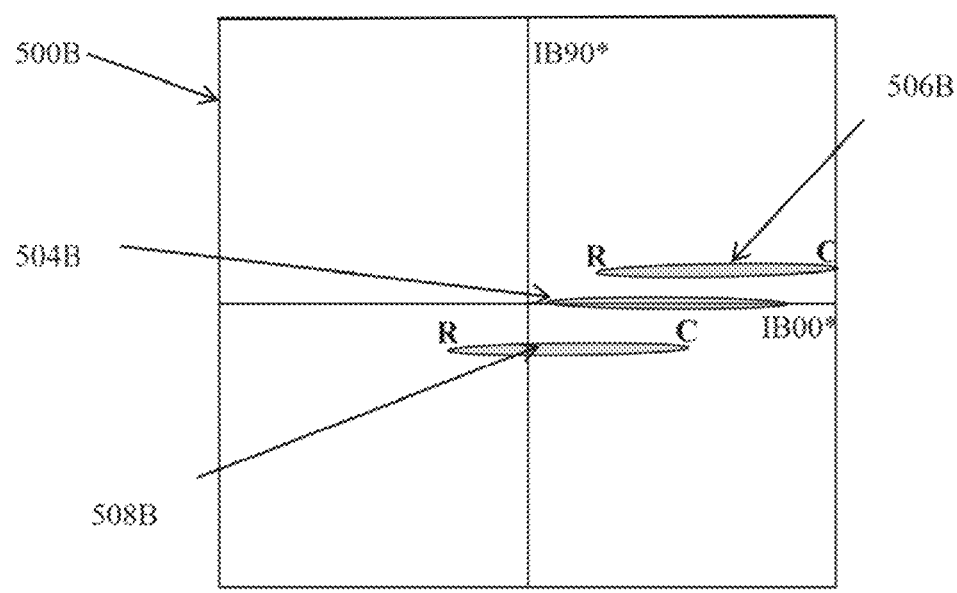
FIG. 5B shows a crossplot of example button current components relative to an applied voltage that have undergone compensation but where an offset exists.

However, the potential anomalies that may be observed in modulus mode when offsets are present can be eliminated or minimized by adaptive phase compensated mode, where the IB00 and IB90 axes are rotated to compensate for the phase shift in the current data. For example, if in FIG. 5A the axes were rotated by −45°, the ellipses 504A, 506A, and 508A would have their long axes aligned along the compensated in-phase axis, e.g. (IB00*) such as shown in FIG. 5B.

Turning back to FIG. 5B, a schematic shows the effect of phase compensation by rotating the acquisition axis (e.g. of FIG. 5A) by −45°. Data distributions at −45° to the IB00 axis (e.g. from FIG. 5A) are now parallel to the rotated axis IB00*. In particular, FIG. 5B shows a crossplot 500B of example button current components relative to an applied voltage that have undergone phase compensation and where an offset exists.

As shown, the compensated in-phase signal IB00* may give data for the three ellipses 504B-508B which differ by an offset, while keeping intact the correct ordering and 'relative distance' between data values, i.e. the current IB00* increases monotonically when going from the most resistive data point R to the most conductive C. When the difference in offset is removed such as by demeaning as part of an equalization processing (described below), the resultant images can be close to that for undistorted data (e.g. ellipse 502A in FIG. 5A).

Referring back to FIG. 5A, an example phase shift of −45° is shown for purpose of illustration. It will be appreciated that the phase compensation method as described may be useful for other phase shifts. It is appreciated that the directions $\phi$ and $\phi \pm 180°$ are parallel and indistinguishable. So it may be sufficient to have the range of $\phi$ be within 180°. For a conducive borehole fluid such as water-based mud (WBM), a phase compensation for $|\phi| \leq 90°$ can be suitable.

With further reference to FIGS. 5A and 5B, data is represented from a single sensor (e.g., electrode or button). It will be appreciated that every sensor, i.e. each electrode on a pad and/or flap, can have a different phase shift and offset. However, since pad/flap construction may be similar if not identical, sensors on the same pad or flap can be considered to have nearly the same phase shift and offset. Sensors from different pads or flaps could show more of different phase shifts and/or offsets, for example because of the different electronics used for each pad/flap, the physical location of the electrodes/buttons, or because of other internal and/or external conditions. In some cases, same or similar phase shifts and offsets may still be used for all pads/flaps on the same tool, optionally with only slight differences.

Thus, it will be appreciated that the same compensation may be applied for all pads and flaps that may be present on a down-hole tool, because the pads and flaps may behave sufficiently close such that compensation can be similar.

With reference to equalization processing, such processing is employed for example to remove offsets in the current data. Equalization is a statistical method to correct for differences in the data due to differences in the sensors (i.e. differences in electronics and physical location of the electrodes/buttons on different pads and/or flaps) and/or external conditions such as imperfect contact with the borehole wall or deposits on the pad/flap face, but unrelated to the properties of the formation. If data are taken from a large depth interval, e.g. 15 feet, or at 1800 data points per button, the distribution of data values due to the formation, for example can be similar in a statistical sense for all electrodes/buttons and all pads/flaps. For example, the mean and standard deviations of the current I can be nearly the same for all sensors. So by transforming the data in such a way to make the mean and standard deviations equal for all sensors, the differences introduced by factors unrelated to the formation can be removed or minimized. In particular, this process can 'remove' or 'minimize' the different offsets for each sensor in phase compensated acquisition as mentioned earlier.

In one example, equalization is done in the following way such as for an equalization depth window:

1—Compute the mean $\bar{x}_k$ and standard deviation $\sigma_k$ of each sensor k in the given equalization depth window. In some examples, certain upper and lower percentiles (e.g., upper 40 percentile and lower 10 percentile) are excluded, or trimmed, by default when computing these statistics.

2—Compute the median values $\bar{x}_m$ and $\sigma_m$, of the $\bar{x}_k$'s and $\sigma_k$'s from step 1.

3—Transform the data values $x_{k,j}$ of sensor k inside the window as:

$$x'_{k,j} = (x_{k,j} - \bar{x}_k)\frac{\sigma_k}{\sigma_m} + \bar{x}_m$$

so that after the transformation, the mean and standard deviations of each sensor will be the same, and equal to $\bar{x}_m$ and $\sigma_m$ respectively.

4—The equalization depth window can be moved to overlapping positions along the entire logged interval of the borehole, so that data for all the sensors in the entire logged interval are equalized by repeated application of steps 1 to 3.

Equalization is a statistical process that may work on a relatively large scale, such as for example an equalization window of about 15 feet or more.

It will be appreciated that in adaptive phase compensated mode data is acquired for example in such a way that can preserve the relative magnitude of the signal. For instance, if the smallest value is negative, the values for the pad and/or flap may increase by the same amount (i.e. the offset) so that this negative value becomes a small positive value. The term equalization is used, because the pads/flaps can read statistically the same range of values, so that the data can be 'offset' for the different pads/flaps until they cover the same range of values. As shown in FIG. 5B, for example, the ellipses can be moved to the left or the right until they have roughly the same max and min values in the x-direction.

Adaptive Phase Compensation Acquisition

Issues mentioned above concerning the need to make repeat passes and the need to have the field engineer decide on the phase compensation to apply can be addressed by using adaptive phase compensation. Adaptive phase compensation acquisition includes determining an average phase shift compensation angle for use in obtaining phase shift compensated current values. In one embodiment, the average phase shift compensation angle is repeatedly and periodically updated, such as at regular intervals, during a logging pass. A given phase compensation angle is used to acquire phase compensated data until it is updated. As one example only, a regular interval for computing the phase compensation angle can be at about 6 inches. However, it will be appreciated this example is not meant to be limiting, as other regular intervals may be employed as appropriate.

With reference to FIG. 7, one example is shown of a flow chart of a general implementation of a method 700 for adaptive phase compensation data acquisition.

The average in-phase button current component (IB00) and average out-of-phase button current component IB90 are computed 702. Computing both an average in-phase current and an average out-of-phase current for each pad disposed on a down-hole tool can include repeatedly acquiring in-phase and out-of-phase current data from the formation relative to a voltage applied to one or more electrodes disposed on said pad over multiple depths within a depth window, and can include averaging the acquired in-phase and out-of-phase current data over the one or more electrodes, so as to obtain the average in-phase current and the average out-of-phase current for each pad at each depth of the multiple depths within the depth window.

In one embodiment, such computing is done for each pad, for example by using a down-hole processor. In some examples, the average currents may be computed for selected middle buttons of each pad and repeatedly computed for multiple depths within a depth window. For example, the multiple depths within the depth window can include depths ranging over a distance from about 1 m to about 10 m. As noted above, it will be appreciated that the firmware and/or software of the down-hole electronics of a logging apparatus can be configured to acquire the in-phase and out-of-phase currents for each pad, for example by using the selected middle buttons. It also will be appreciated that a similar computation may be performed and acquired from each flap that may be present on a down-hole tool.

An average phase shift compensation angle is determined at 704. Determining an average phase shift compensation angle from each respective phase shift compensation angle calculated for each pad of the down-hole tool can generally include estimating a slope of a fitted line that passes through a distribution of data points of a cross plot of the computed average in-phase currents and the computed average out-of-phase currents for each pad accumulated within the depth window, where the phase shift compensation angle is taken to be the slope angle of the fitted line.

In one embodiment, the computed average in-phase button current and out-of-phase button current can be sent from a down-hole processor to a surface processor which subsequently determines the average phase shift compensation angle. It will be appreciated that this transmission can be repeated at each tool depth (position) inside a depth window that covers a depth range, for example of about 1 m to about 10 m. An average phase shift compensation angle is determined from the multiple slope angles, based on cross plots of the average in-phase button currents and the average out-of-phase button currents transmitted from all depths in a depth window that covers a depth range, for example of about 1 m to about 10 m. In some embodiments, determination of the average phase shift compensation angle can be performed either using a surface processor or a down-hole processor. The phase shift compensation angle can be determined for example for each pad and/or flap of a down-hole tool by estimating the slope of a fitted line that passes through a distribution of data points of an IB00/IB90 crossplot, where the slope of the line is the arctangent of the phase shift compensation angle.

In one example, the method of orthogonal least squares may be used to find the fitted line by maximizing the ratio of the root-mean-square deviation of the data points about the center-of-mass of the data points measured in the direction parallel to the line, relative to the root-mean-square deviation of the data points about the center-of-mass of the data points measured in the direction perpendicular to the line. It will be appreciated that other suitable fitting methods or techniques may also be used to find the fitted lines.

An average phase shift compensation angle can then be determined by a weighted average of the slope angles determined from the fitted lines, for example of all the pads/flaps of a down-hole tool. In some embodiments, once the average phase shift compensation angle is determined the angle can be sent from the surface processor to the down-hole processor for application to subsequent down-hole current data acquisitions.

In some examples, the average phase shift compensation angle for a given depth may be stored in a surface or downhole memory component.

At 706, the average phase shift compensation angle determined may be applied to in-phase and out-of-phase current data that are subsequently acquired by each pad and/or flap of the down-hole tool from the formation over a depth of the borehole to be measured, so as to obtain phase shift compensated current values over the depth of the borehole to be measured.

In some embodiments, each phase shift compensated current value is a single number based on a linear combination of the in-phase and out-of-phase current data weighted by the cosine and sine of the average phase shift compensation angle $\phi$. For example, the phase compensated current can be calculated as $I_{phase\ compensated} = I_{in\text{-}phase} \cos \phi + I_{out\text{-}of\text{-}phase} \sin \phi$.

In some examples, the average phase shift compensation angle can then be applied to subsequent current data acquisitions until the next update.

In some embodiments, the phase shift compensated current values obtained can be sent from the down-hole processor to the surface processor as single numbers via a transmission component. In other embodiments, the phase shift compensated current values can be saved down-hole and retrieved later at surface.

The phase shift compensated current values are numbers representing a linear combination of the two current components, $I_{in\text{-}phase}$ and $I_{out\text{-}of\text{-}phase}$, and they capture information on the complex current (i.e. its direction with a maximum variation with respect to the formation.), which can increase the efficiency in data acquisition, storage, and transmission.

At 708, an image based on the phase shift compensated current values obtained can be formed for the borehole wall.

In some examples, the phase compensation angle(s) can be determined at regular intervals along the borehole or well to allow for changes of compensation that may occur at different depths. In such a case, the most recent phase compensation angle(s) determined may be smoothed using previously determined phase compensation values to increase the robustness of the computation.

In some examples, the same phase compensation is applied to all pads and/or flaps that may be present on a down-hole tool.

In other examples, it may be desired to compute the phase compensation angle(s) using only data from the pads, i.e., excluding the flaps. This is because more noise/cross-talk may sometimes be observed in the data provided by the flaps, resulting from for example, the construction of a down-hole tool.

Results of Adaptive Phase Compensated Acquisition

Figure 8:
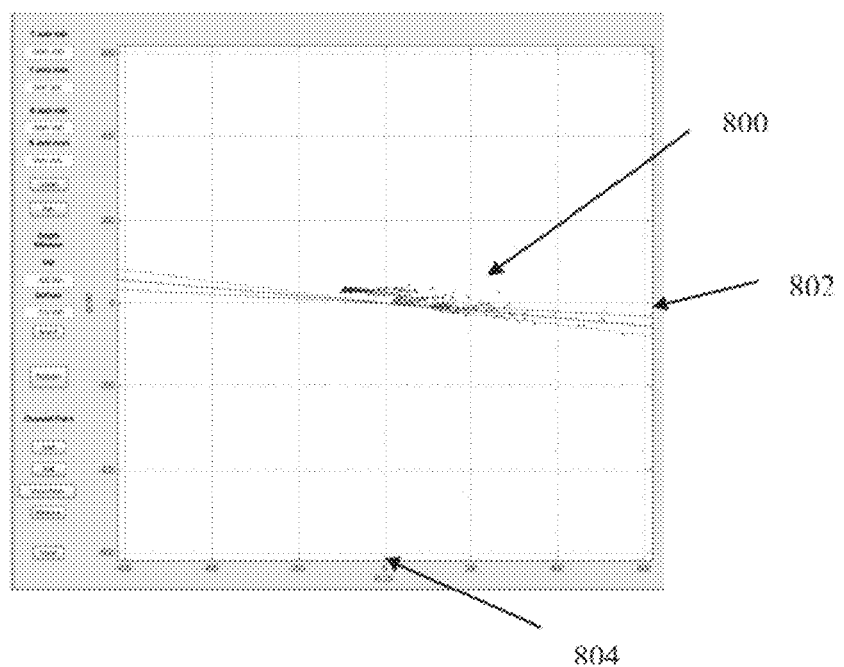
FIG. 8 shows a crossplot of example in-phase and out-of-phase button current components for the image taken by adaptive phase compensation acquisition as in FIG. 5.

With reference again to FIG. 6, FIG. 6 shows an image 600 of a borehole wall taken in accordance with the adaptive phase compensation acquisition compared to an image 602 taken in accordance with modulus mode acquisition. FIG. 8 shows a crossplot of example in-phase and out-of-phase button current components from which images 600 and 602 are based. FIGS. 6 and 8 show a presentation of images, logs, and crossplots. FIG. 6 includes images along multiple depths (see 600 and 602 in FIG. 6 at depths X1, X2, X3, and X4), resistivity logs (see e.g. RLA2 and RLA5), and log of applied phase compensation (see e.g. ACQSHIFT). FIG. 8 shows a crossplot 800 of the in-phase and out-of-phase button currents for the individual pads and flaps of an example downhole tool.

With respect to FIG. 6, in an image track of a four pad/four flap down-hole tool: the image from pad 1 is denoted by a line 604 passing through its mid-point. To the right of pad 1 are: flap 1, pad 2, flap 2, pad 3, flap 3, pad 4 and flap 4. Each of images 600 and 602 includes a line 604 which gives the orientation of pad 1 relative to a reference azimuth (zero at the left edge of the track), which for example may be north or top-of-hole as indicated in the header.

As shown in FIG. 6, the images have been enhanced for example by dynamic color normalization with a window of 2 feet. Dynamic color normalization means that the color scale is dynamically adjusted so that within a 2 feet window, all colors frequently appear about equal. The image contrast is thereby enhanced, but the one-to-one correlation between color and resistivity may be lost, i.e., the same color at different depths may not necessarily correspond to the same rock resistivity (actual button current). The color darkens as resistivity decreases. However, it will be appreciated that the color and scales shown are not absolute, as white and black correspond simply to the highest and lowest resistivity encountered in a particular well investigated.

With respect to FIG. 8 and the crossplot 800 shown, the x-axis is IB00/BC00, and the y-axis is IB90/BC90 respectively (802, 804) for adaptive/modulus. These values are computed for each pad and flap by averaging over middle buttons on each pad and flap, and after a phase compensation has been applied. After phase compensation, the averaged data trend on the crossplots may be roughly horizontal (zero phase shift). The compensation is then computed from data in the past.

FIGS. 6 and 8 confirm that adaptive phase compensated mode can eliminate or minimize the anomalies that may be seen in modulus mode, and that adaptive compensation can work well in tracking phase shift variations, such as from −50 to 0° in this case. More particularly, FIG. 6 shows an interval from an exemplary investigation job (mud resistivity, $\rho_m$=0.083 Ωm), for example where formation resistivity in invaded zone/close to borehole, $\rho_m$), is in the range of 30-120 Ωm and a phase compensation of −42° was applied (in adaptive mode). The modulus image 602 shows color reversal and white traces in the entire interval on pad and flap 3, and to a lesser extent on pad and flap 4. See arrows in FIG. 6 pointing within the modulus image 602 and compare corresponding regions in the adaptive mode image 600. As shown in image 600, pads/flaps 1 and 2, and the in-phase images are relatively free of such defects. In FIG. 8, the image defects in the modulus image tie up nicely with the crossplot. Most of the pad 3 data lies where color reversal should occur, as are about ~½ of the points for pad 4. The data for pad 1 and 2 are so positioned that color reversal does not occur.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of investigating a formation surrounding a borehole, comprising:
   computing both an average in-phase current and an average out-of-phase current for each pad disposed on a down-hole tool by repeatedly acquiring in-phase and out-of-phase current data from the formation relative to a voltage applied to one or more electrodes disposed on said pad over multiple depths within a depth window;
   averaging the acquired in-phase and out-of-phase current data over the one or more electrodes to obtain the average in-phase current and the average out-of-phase current for each pad at each depth of the multiple depths within the depth window;
   determining an average phase shift compensation angle from each respective phase shift compensation angle calculated for each pad of the down-hole tool;
   applying the average phase shift compensation angle determined to in-phase and out-of-phase current data subsequently acquired by each pad of the down-hole tool from the formation over a depth of the borehole to be measured to obtain phase shift compensated current values over the depth of the borehole to be measured; and
   forming an image of the borehole based on the phase shift compensated current values.

2. The method of claim 1, wherein each phase shift compensated current value comprises a single number based on a linear combination of the in-phase and out-of-phase current data weighted by the cosine and sine of the average phase shift compensation angle.

3. The method of claim 1, further comprising repeatedly and periodically updating the average phase shift compensation angle after the down-hole tool has passed the depth of the borehole to be measured and the average phase shift compensation angle has been applied to the subsequent acquisitions over the depth of the borehole to be measured, and applying the updated average phase shift compensation angle over another depth of the borehole to be measured.

4. The method of claim 1, wherein forming the image comprises removing offsets that are present in the phase shift compensated current values through an equalization processing.

5. The method of claim 1, further comprising storing the phase shift compensated current values in a memory component of the down-hole tool.

6. The method of claim 1, further comprising sending the phase shift compensated current values to surface via a transmission component.

7. The method of claim 1, wherein the determining step is performed down-hole.

8. The method of claim 1, wherein the determining step is performed at surface.

9. The method of claim 8, further comprising:
   sending the computed average in-phase currents and average out-of-phase currents from down-hole to surface for subsequent surface processing; and
   sending the determined average phase shift compensation angle from surface to down-hole for subsequent down-hole application.

10. The method of claim 1, wherein the computing step comprises selecting one or more middle electrodes within an electrode array of each pad to acquire the in-phase and out-of-phase current data.

11. A system for investigating a formation surrounding a borehole, comprising:
    a plurality of pads disposed on a down-hole tool, each pad comprising a plurality of electrodes configured to acquire in-phase current data and out-of-phase current data from the formation relative to a voltage applied to the electrodes; and
    at least one processor configured to
    1) compute both an average in-phase current and an average out-of-phase current for each pad of the down-hole tool by repeatedly acquiring in-phase and out-of-phase current data from the formation relating to one or more selected electrodes of each pad over multiple depths within a depth window and averaging the acquired in-phase and out-of-phase current data over the selected electrode(s), to obtain the average in-phase current and the average out-of-phase current for each pad at each depth of the multiple depths within the depth window;
    2) determine an average phase shift compensation angle based on each respective phase shift compensation angle calculated for each pad of the down-hole tool; and
    3) apply the average phase shift compensation angle determined to in-phase and out-of-phase current data subsequently acquired by each pad of the down-hole tool from the formation over a depth of the borehole to be measured to obtain phase shift compensated current values over the depth of the borehole to be measured.

12. The system of claim 11, wherein the at least one processor is further configured to calculate each phase shift compensated current value as a single number based on a linear combination of the in-phase and out-of-phase current data weighted by the cosine and sine of the average phase shift compensation angle.

13. The system of claim 11, wherein the at least one processor is further configured to form an image of the borehole based on the phase shift compensated current values that involves removing offsets that are present in the phase shift compensated current values through equalization processing.

14. The system of claim 11, wherein the at least one processor is further configured to repeatedly and periodically update the average phase shift compensation angle after the down-hole tool has passed the depth of the borehole to be measured and the average phase shift compensation angle has been applied to the subsequent acquisitions over the depth of the borehole to be measured, and to apply the updated average phase shift compensation angle over another depth of the borehole to be measured.

15. The system of claim 11, further comprising a memory component included in the down-hole tool and configured to store the phase shift compensated current values obtained.

16. The system of claim 11, wherein the at least one processor comprises a down-hole processor included in the down-hole tool and configured to 1) compute the average in-phase and average out-of-phase current data; 2) determine the average phase shift compensation angle; and 3) apply the average phase shift compensation angle to subsequent acquisitions of in-phase and out-of-phase current data.

17. A method of investigating a formation surrounding a borehole, comprising:
  acquiring in-phase current data and out-of-phase current data from the formation relative to a voltage applied to a plurality of electrodes disposed on a down-hole tool at multiple depths;
  determining absolute values of current based on the in-phase current data and the out-of-phase current data acquired from the electrodes at each depth of the multiple depths; and
  forming an image of the borehole based on the absolute values of current determined.

18. The method of claim 17, further comprising storing the absolute values of current in a memory component of the down-hole tool.

19. The method of claim 17, further comprising sending the absolute values of current as single numbers to surface via a transmission component.

* * * * *